US012078946B2

(12) United States Patent
Endo

(10) Patent No.: US 12,078,946 B2
(45) Date of Patent: *Sep. 3, 2024

(54) IMAGE FORMING APPARATUS

(71) Applicant: TOSHIBA TEC KABUSHIKI KAISHA, Tokyo (JP)

(72) Inventor: Sasuke Endo, Kanagawa (JP)

(73) Assignee: TOSHIBA TEC KABUSHIKI KAISHA, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 18/297,524

(22) Filed: Apr. 7, 2023

(65) Prior Publication Data

US 2023/0297012 A1 Sep. 21, 2023

Related U.S. Application Data

(63) Continuation of application No. 17/700,229, filed on Mar. 21, 2022, now Pat. No. 11,650,526.

(51) Int. Cl.
*G03G 15/20* (2006.01)

(52) U.S. Cl.
CPC ................................ *G03G 15/2039* (2013.01)

(58) Field of Classification Search
CPC .................................................. G03G 15/2039
See application file for complete search history.

(56) References Cited

U.S. PATENT DOCUMENTS 11,650,526 B1 * 5/2023 Endo .................. G03G 15/6508 399/69
2006/0204266 A1 9/2006 Watabe
2015/0338801 A1 11/2015 Nishino
2016/0327890 A1 11/2016 Shiki et al.

FOREIGN PATENT DOCUMENTS

JP 2009-139729 A 6/2009
JP 2009-276427 A 11/2009
JP 2013-235051 A 11/2013

OTHER PUBLICATIONS

Notice of Allowance on U.S. Appl. No. 17/700,229 DTD Jan. 10, 2023.

* cited by examiner

*Primary Examiner* — Stephanie E Bloss
*Assistant Examiner* — Michael A Harrison
(74) *Attorney, Agent, or Firm* — FOLEY & LARDNER LLP

(57) ABSTRACT

An image forming apparatus includes a plurality of sheet storage receptacles configured to store a sheet. The image forming apparatus also includes a fixing device having a heating belt and a pressure roller configured to heat and fix toner on the sheet conveyed from one of the plurality of sheet storage receptacles. The image forming apparatus also includes a processor and a memory configured to store temperature information associated with each sheet storage receptacle and related to temperature control of the fixing device, acquire type information of a sheet to be printed, in response to a predetermined condition, specify the sheet storage receptacle storing the sheet to be printed, and perform a first heating control that controls a temperature of the fixing device based on the stored temperature information associated with the specified sheet storage receptacle.

20 Claims, 11 Drawing Sheets

TB1

| PAPER FEED CASSETTE | | SHEET SIZE |
|---|---|---|
| PAPER FEED CASSETTE ID | SHEET STORAGE CAPACITY (SHEET) | |
| a | 1500 | A4 |
| b | 1000 | A3 |
| c | 1000 | A5 |

TB2

| PAPER FEED CASSETTE ID | TEMPERATURE INFORMATION | | |
|---|---|---|---|
| | TEMPERATURE PATTERN | CENTER (°C) | SIDE (°C) |
| a | A | HIGH | LOW |
| b | B | HIGH | HIGH |
| c | A | HIGH | LOW |

FIG. 15

TB3

| PAPER FEED CASSETTE | | SHEET SIZE |
|---|---|---|
| PAPER FEED CASSETTE ID | LOCATION | |
| a | HIGH | A4 |
| b | MIDDLE | A3 |
| c | LOW | A5 |

FIG. 16

TB4

| PAPER FEED CASSETTE | | NUMBER OF CASSETTES STORING SHEETS HAVING SAME SIZE |
|---|---|---|
| PAPER FEED CASSETTE ID | SHEET SIZE | |
| a | A4 | 2 |
| b | A4 | |
| c | A3 | 1 |

FIG. 17

TB5

| PAPER FEED CASSETTE | | SHEET SIZE |
|---|---|---|
| PAPER FEED CASSETTE ID | USAGE HISTORY (MOST RECENT) | |
| a | 2021/12/15 15:33 | A4 |
| b | 2021/12/15 11:21 | A3 |
| c | 2021/12/14 20:45 | A5 |

FIG. 18

TB6

| PAPER FEED CASSETTE | | SHEET SIZE |
|---|---|---|
| PAPER FEED CASSETTE ID | USAGE FREQUENCY (NUMBER OF PRINTED SHEETS FOR LAST THREE DAYS) | |
| a | 1051 | A4 |
| b | 328 | A3 |
| c | 234 | A5 |

IMAGE FORMING APPARATUS

CROSS-REFERENCE TO RELATED APPLICATION

This application is a continuation of U.S. patent application Ser. No. 17/700,229, filed on Mar. 21, 2022, the entire contents of each of which are incorporated herein by reference.

FIELD

Embodiments described herein relate to an image forming apparatus.

BACKGROUND

In an office and the like, image forming apparatuses such as a printer, a multifunction device, and the like are widely used. Such image forming apparatuses may include a fixing unit that heats toner on a sheet. The fixing unit includes a heating roller and a pressure roller, and both the rollers form a nip area. The fixing unit includes a heating heater, which is heated according to a type of the sheet. If the sheet passes through the nip area, the toner on the sheet is heated and fixed.

DESCRIPTION OF THE DRAWINGS

FIG. 15 is a table illustrating a cassette-sheet size correspondence table TB3 in which the paper feed cassette and the sheet size are associated with each other, according to an exemplary embodiment;

FIG. 16 is a table illustrating a cassette-cassette number correspondence table TB4 in which the paper feed cassette and the sheet size are associated with each other, according to an exemplary embodiment;

FIG. 17 is a table illustrating a cassette-sheet size correspondence table TB5 in which the paper feed cassette and the sheet size are associated with each other, according to an exemplary embodiment;

FIG. 18 is a table illustrating a cassette-sheet size correspondence table TB6 in which the paper feed cassette and the sheet size are associated with each other, according to an exemplary embodiment.

DETAILED DESCRIPTION

In an image forming apparatus as described above, before the start of warming-up, the type of sheet to be printed may not be clearly known. In this case, if the heating heater is heated at a maximum output, as a result, power consumption increases because it is not required to perform heating at the maximum output if a sheet having a small size is printed. Therefore, it may not be possible to efficiently heat the fixing unit.

In the present disclosure, in general, according to at least one exemplary, non-limiting embodiment, an image forming apparatus includes a plurality of sheet storage receptacles, a fixing device, and a processor and a memory. The plurality of sheet storage receptacles store a sheet. The fixing unit includes a heating belt and a pressure roller configured to heat and fixe toner on a sheet conveyed from one of the plurality of sheet storage receptacles. The processor and the memory are configured to store temperature information associated with each sheet storage receptacle and related to temperature control of the fixing device, acquire type information of a sheet to be printed, in response to a predetermined condition, specify the sheet storage receptacle storing the sheet to be printed, and perform a first heating control that controls a temperature of the fixing device based on the stored temperature information associated with the specified sheet storage receptacle.

Figure 1:
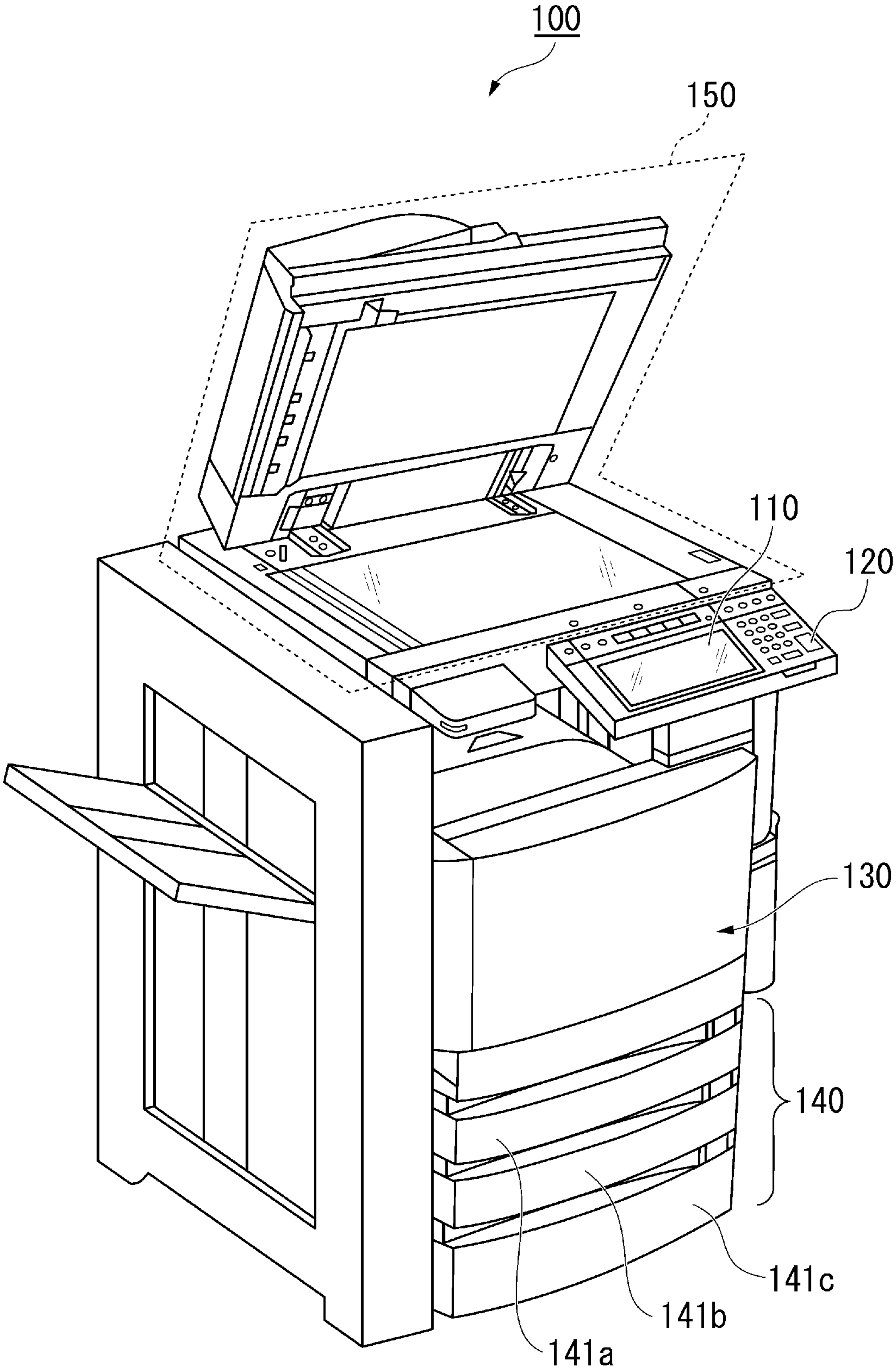
FIG. 1 is a perspective view of an image forming apparatus, according to an exemplary embodiment.

FIG. 1 is a perspective view of an image forming apparatus 100, according to at least one exemplary embodiment. The image forming apparatus 100 is, for example, a multifunction device. The image forming apparatus 100 includes a display 110, a control panel 120, a printer 130, a sheet storage unit 140, and an image reading unit 150.

The display 110 is, for example, a touch panel type liquid crystal display. The display 110 displays various information. The display 110 receives an operation from a user.

In some embodiments, the control panel 120 includes various operation keys such as a numeric keypad, a start key, and the like. The control panel 120 receives various input operations from the user. The control panel 120 outputs, to a control unit (a CPU 201), an operation signal in response to various input operations received from the user.

The printer 130 performs a series of printing operations by using various information output from the display 110, the control panel 120, the image reading unit 150, and the like. The series of printing operations include an operation of inputting image information, an operation of forming an image, an operation of transferring the formed image to a sheet, an operation of conveying the sheet, and the like.

The sheet storage unit 140 includes a plurality of paper feed cassettes 141 (141*a*, 141*b*, and 141*c*). Each of the paper feed cassettes 141*a*, 141*b*, and 141*c* stores a sheet, respectively. The sheet is mainly ordinary copy paper, but may also be thick paper, a photographic sheet, a label sheet, a polyester film sheet, and the like.

The image reading unit 150 includes an automatic document feed apparatus and a scanner apparatus. The automatic document feed apparatus sends out a document placed on a document tray to the scanner apparatus. The scanner apparatus optically scans the document on a document glass table and forms an image of reflected light from the document on a light receiving surface of a charge coupled device (CCD) sensor. Accordingly, the scanner apparatus reads a document image on the document glass table. The image reading unit 150 generates image information (image data) by using a reading result read by the scanner apparatus.

Figure 2:
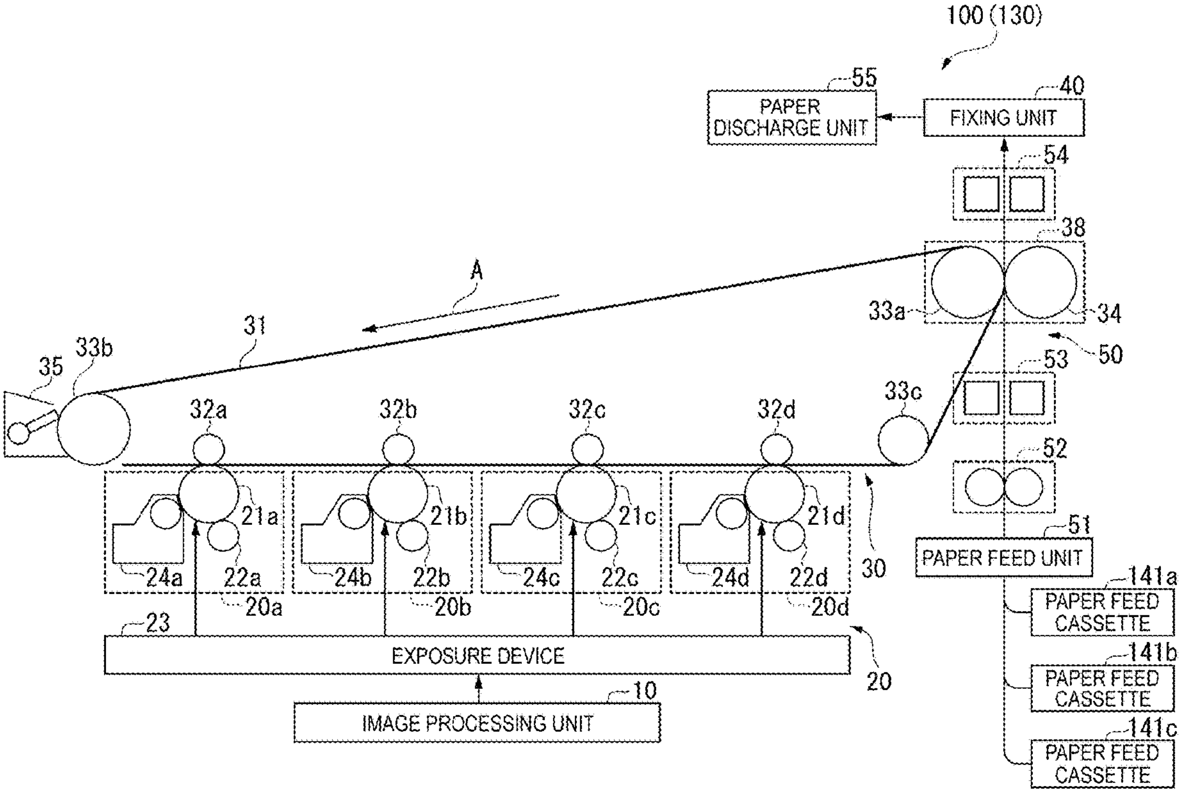
FIG. 2 is a block diagram illustrating an internal configuration of the image forming apparatus.

FIG. 2 is a block diagram illustrating an internal configuration of the image forming apparatus 100. As illustrated in FIG. 2, the image forming apparatus 100 (the printer 130) includes four image forming units 20*a* to 20*d* in parallel. The image forming apparatus 100 is a so-called quadruple tandem type image forming apparatus. The image forming apparatus 100 includes an image processing unit 10, an image forming unit 20 (20*a* to 20*d*), an intermediate transfer unit 30, a fixing unit 40, and a sheet conveyance unit 50.

The image processing unit 10 inputs image information. The image information to be input is the image information generated by the image reading unit 150 or image information transmitted from another apparatus. The image processing unit 10 performs digital image processing for processing the input image information according to an initial setting or a setting by a user. For example, the digital image processing includes gradation correction based on gradation correction data. In addition to the gradation correction, the digital image processing includes various correction processing such as color correction and shading correction, and compression processing with respect to the image data.

Next, the image forming unit 20 (the image forming units 20*a* to 20*d*) will be described. The image forming unit 20 includes the image forming unit 20*a* corresponding to Y (yellow), the image forming unit 20*b* corresponding to M (magenta), the image forming unit 20*c* corresponding to C (cyan), and the image forming unit 20*d* corresponding to K (black). Each of the image forming units 20*a* to 20*d* includes photosensitive drums 21*a* to 21*d*, chargers 22*a* to 22*d*, an exposure device 23, developing devices 24*a* to 24*d*, toner cartridges 25*a* to 25*d*, a drum cleaning apparatus which is not illustrated, and the like. In the following description, the reference signs of "a to d" will be omitted.

In some embodiments, the photosensitive drum 21 is, for example, a charged organic photo-conductor (OPC) in which an undercoat layer, a charge generation layer, and a charge transport layer are sequentially stacked on a peripheral surface of a conductive cylindrical body made of aluminum. The photosensitive drum 21 has a photoconductivity property (i.e., is photoconductive).

The charger 22 generates corona discharge. The charger 22 uniformly charges a surface of the photosensitive drum 21.

In some embodiments, the exposure device 23 is, for example, a semiconductor laser. The exposure device 23 irradiates the photosensitive drum 21 with a laser beam corresponding to an image of each color component. If the laser beam is emitted by the exposure device 23, a potential of an area irradiated with the laser beam in an area of the surface of the photosensitive drum 21 changes. Due to the change in potential (a potential difference), an electrostatic latent image is formed on the surface of the photosensitive drum 21.

The developing device 24 contains a developer. The developing device 24 causes toner of each color component to adhere to the surface of the photosensitive drum 21. Accordingly, a toner image is formed on the photosensitive drum 21. That is, the electrostatic latent image formed on the surface of the photosensitive drum 21 is visualized.

Here, the developer will be described. In some embodiments, the developer is a two-component developer. The two-component developer includes a non-magnetic toner and a carrier. The carrier may be, for example, iron powder having a particle size of several tens of μm and polymer ferrite particles. The carrier is mixed with the toner in the developing device 24 and is triboelectrically charged, thereby giving a charge (for example, a negative charge) to the toner. The carrier conveys the toner to an electrostatic latent image unit by magnetic force.

The drum cleaning apparatus, which is not illustrated, includes a cleaning blade in contact with the surface of the photosensitive drum 21. The cleaning blade removes residual toner remaining on the surface of the photosensitive drum 21 after primary transfer is performed. The removed residual toner is collected in a storage unit provided in the drum cleaning apparatus.

Next, the intermediate transfer unit 30 will be described. The intermediate transfer unit 30 includes an intermediate transfer body 31, a primary transfer roller 32, a plurality of support rollers 33, a secondary transfer roller 34, a belt cleaning apparatus 35, and the like.

In some embodiments, the intermediate transfer body 31 is, for example, an endless belt (a transfer belt). The intermediate transfer body 31 is a belt that does not have conductive and elastic properties. Specifically, for example, the intermediate transfer body 31 is a belt made of polyimide. However, the intermediate transfer body 31 may have conductive and elastic properties.

The support rollers 33*a* to 33*c* support the intermediate transfer body 31 so that tension is applied to the intermediate transfer body 31. Accordingly, the intermediate transfer body 31 is formed in a loop shape. Any one of the plurality of support rollers 33*a* to 33*c* (for example, the support roller 33*a*) may be a drive roller. The rollers other than the drive roller are driven rollers. By driving and rotating the drive roller, the intermediate transfer body 31 travels in a direction A, as shown in FIG. 2, at a predetermined speed and in a predetermined cycle.

Referring to FIG. 2, a direction in which the intermediate transfer body 31 moves can be defined as an upstream direction and a downstream direction. Specifically, the upstream direction is a direction in which the intermediate transfer body 31 moves (i.e., the direction A). The downstream direction is a direction opposite the direction A.

The primary transfer roller 32 is disposed to face the photosensitive drum 21 via the intermediate transfer body 31. Specifically, the primary transfer roller 32 is disposed so as to apply pressure to the photosensitive drum 21 in a state where the intermediate transfer body 31 is interposed between the primary transfer roller 32 and the photosensitive drum 21. Accordingly, the primary transfer roller 32 and the photosensitive drum 21 form a primary transfer unit for nipping the intermediate transfer body 31.

In some embodiments, when the intermediate transfer body 31 passes through the primary transfer unit, the toner image formed on the photosensitive drum 21 is transferred to the intermediate transfer body 31. When the intermediate transfer body 31 passes through the primary transfer unit, a primary transfer bias is applied to the primary transfer roller 32. Specifically, for example, a charge having opposite polarity (positive polarity) to the toner is applied to the primary transfer roller 32. Accordingly, the toner image formed on the photosensitive drum 21 is electrostatically transferred to the intermediate transfer body 31.

The secondary transfer roller 34 is disposed to face the support roller 33*a* via the intermediate transfer body 31. Specifically, the secondary transfer roller 34 is disposed so as to apply pressure to the support roller 33*a* in a state where the intermediate transfer body 31 is interposed between the secondary transfer roller 34 and the support roller 33*a*. Accordingly, the secondary transfer roller 34 and the support roller 33*a* form a secondary transfer unit 38 for nipping the intermediate transfer body 31 and the sheet.

In some embodiments, when the sheet passes through the secondary transfer unit 38, the toner image formed on the intermediate transfer body 31 is transferred to the sheet. When the sheet passes through the secondary transfer unit 38, a secondary transfer bias is applied to the support roller 33*a*. Specifically, a charge having the same polarity (negative polarity) as that of the toner is applied to the support roller 33*a*. Accordingly, the toner image formed on the intermediate transfer body 31 is electrostatically transferred to the sheet.

The secondary transfer roller 34 and the support roller 33*a* are configured to be able to be separated from each other. Accordingly, if the sheet is jammed in the secondary transfer unit 38, a user can remove the sheet.

The belt cleaning apparatus 35 includes a cleaning blade in contact with a surface of the intermediate transfer body 31. The cleaning blade removes residual toner remaining on the surface of the intermediate transfer body 31 after the secondary transfer is performed. The removed residual toner is collected in a storage unit provided in the belt cleaning apparatus 35.

The fixing unit 40 heats and pressurizes the sheet to which the toner image is transferred. The fixing unit 40 is, for example, a roller type unit including a heating roller for heating the sheet and a pressure roller for pressing against the heating roller. Accordingly, the fixing unit 40 fixes the toner image to the sheet. A method of fixing the toner image to the sheet by performing heating via a film-shaped member can also be applied to the fixing unit 40.

Next, the sheet conveyance unit 50 will be described. The sheet conveyance unit 50 includes a paper feed unit 51, a registration unit 52, a first guide unit 53, a second guide unit 54, and a paper discharge unit 55.

The paper feed unit 51 conveys the sheets being stored in the sheet storage unit 140 (the paper feed cassettes 141*a*, 141*b*, and 141*c*) one by one to the registration unit 52. The registration unit 52 stops the sheet conveyed from the paper feed unit 51 and sends out the stopped sheet to the secondary transfer unit 38 at a predetermined timing. The predetermined timing is a timing at which the toner image formed on the intermediate transfer body 31 is secondarily transferred by the secondary transfer unit 38. The first guide unit 53 regulates a conveyance direction of the sheet sent out from the registration unit 52 to the secondary transfer unit 38.

The secondary transfer unit 38 transfers the toner image to the sheet, the conveyance direction of which is regulated by the first guide unit 53. The secondary transfer unit 38 sends out the sheet, to which the toner image is transferred, toward the fixing unit 40.

The second guide unit 54 regulates a conveyance direction of the sheet sent out from the secondary transfer unit 38 to the fixing unit 40. The fixing unit 40 heats and pressurizes the sheet, the conveyance direction of which is regulated by the second guide unit 54, and sends out the sheet to the paper discharge unit 55. The paper discharge unit 55 sends out the sheet to a discharge tray.

Next, a hardware configuration of the image forming apparatus 100 will be described with reference to FIG. 3.

Figure 3:
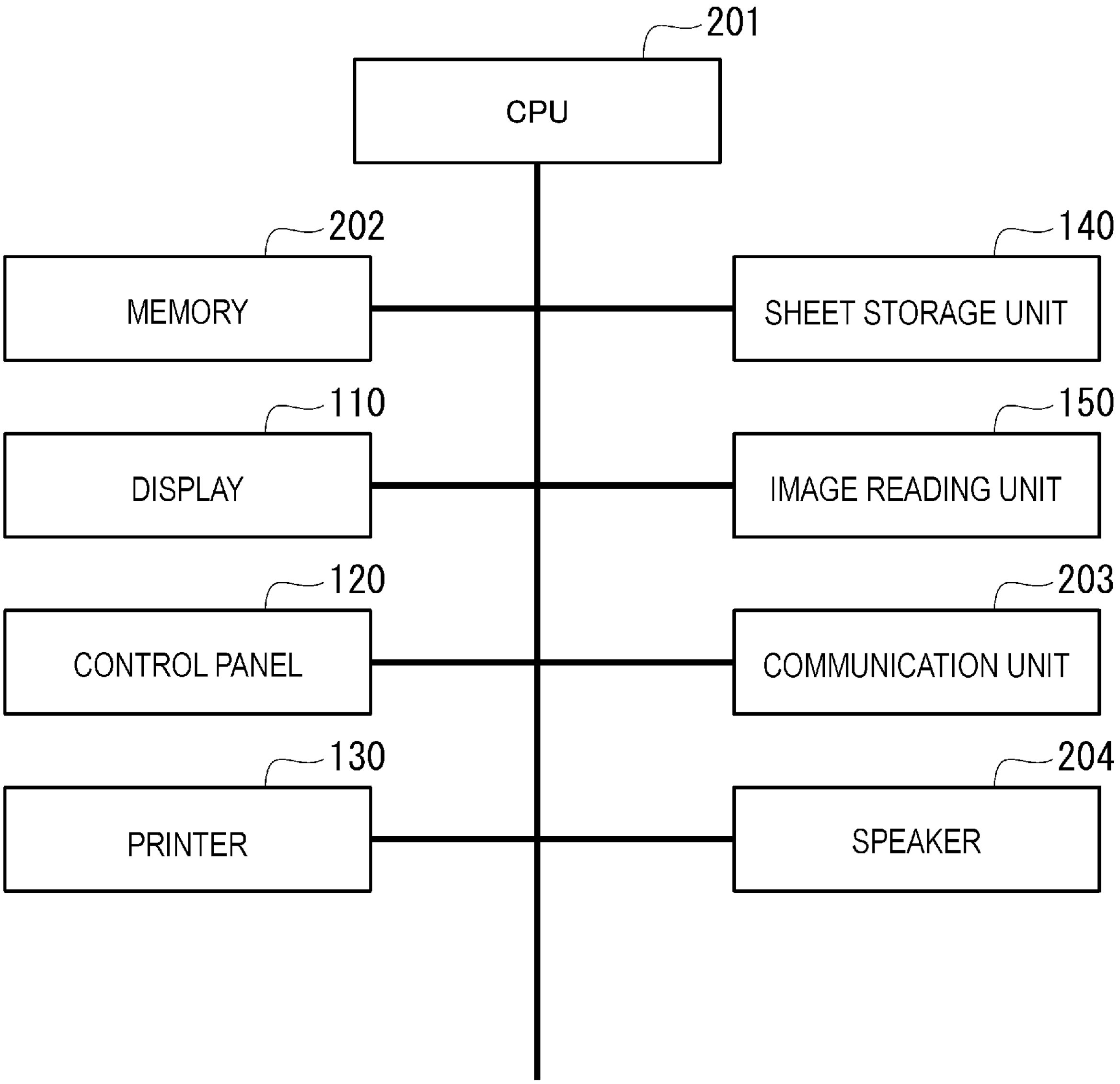
FIG. 3 is a block diagram illustrating a hardware configuration of the image forming apparatus, according to an exemplary embodiment.

FIG. 3 is a block diagram illustrating a hardware configuration of the image forming apparatus 100, according to an exemplary embodiment. As illustrated in FIG. 3, in addition to the above-described configuration, the image forming apparatus 100 includes the central processing unit (CPU) 201, a memory 202, a communication unit 203, and a speaker 204. The CPU 201, the memory 202, the communication unit 203, and the speaker 204 are configured to communicate with each other via a bus.

The CPU 201 is a central processing unit (e.g., a processor, a microcomputer, a computer, etc.), and controls an operation of the image forming apparatus 100 by reading and executing various programs being stored in the memory 202.

Examples of the memory include a ROM, a RAM, a hard disk, and the like. The ROM is a read-only memory and stores various information used by the CPU 201 including a program. The RAM is a memory that can be read and written, and stores various information. For example, the RAM stores information acquired from the outside and information generated in various processing. The hard disk stores various information.

The communication unit 203 is an interface for transmitting and receiving information to and from other apparatuses. Other apparatuses include a personal computer, a smartphone, a tablet terminal, and the like. The communication unit 203 is connected to other apparatuses via a wired or wireless network.

The speaker 204 is configured to output a voice.

Next, a configuration of the fixing unit 40 will be described with reference to FIG. 4.

Figure 4:
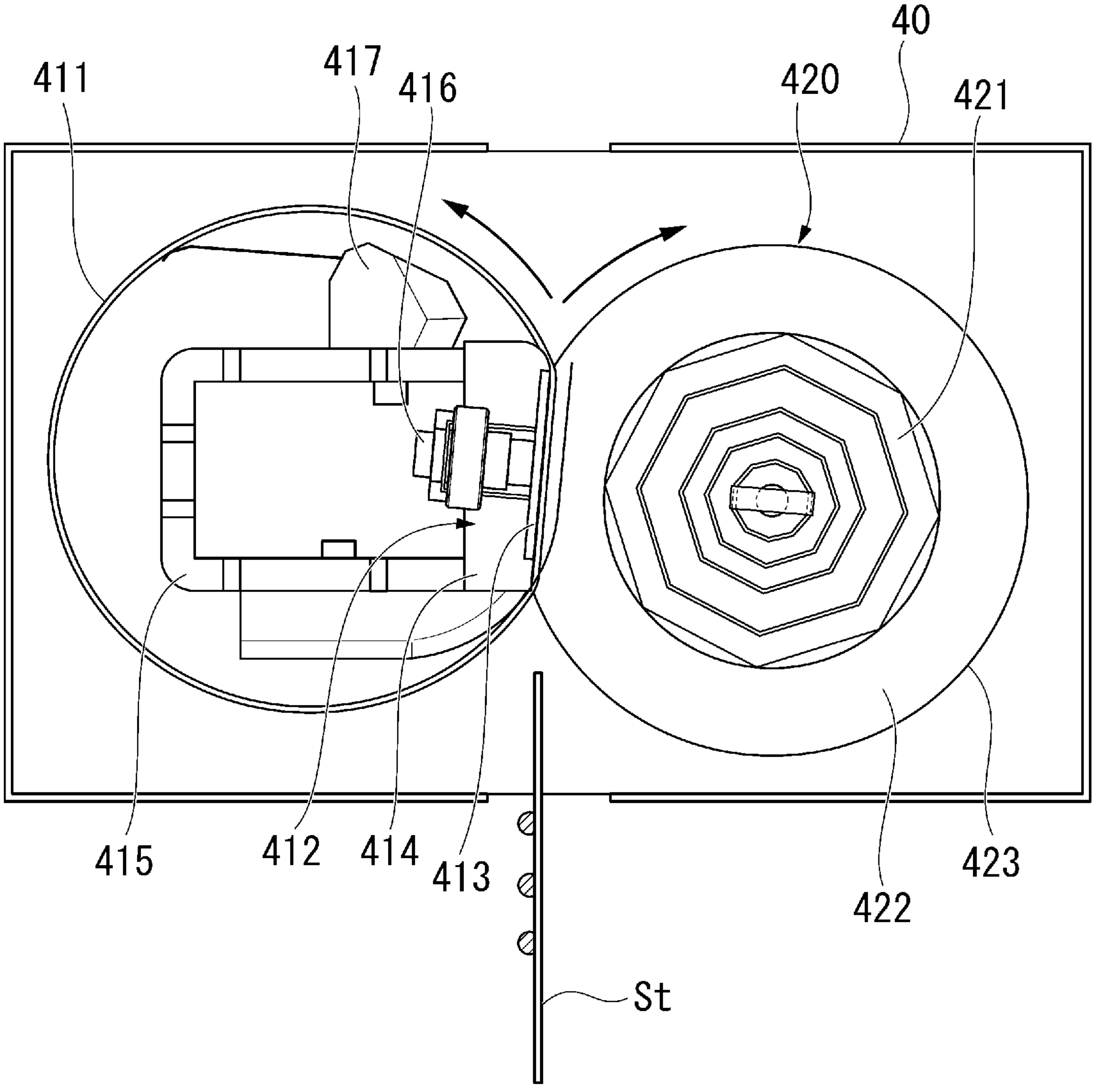
FIG. 4 is a diagram illustrating a fixing unit of the image forming apparatus, according to an exemplary embodiment.

FIG. 4 is diagram illustrating the fixing unit 40 of the image forming apparatus 100, according to an exemplary embodiment. The fixing unit 40 includes a heating belt 411 and a pressure roller 420. The heating belt 411 is a belt having an endless peripheral surface and is in contact with the pressure roller 420.

In some embodiments, the heating belt 411 includes a base layer, an elastic layer, and a surface release layer layered on an inner surface of the heating belt 411.

In some embodiments, a sheet-shaped member having high heat resistance is used for the base layer. Specifically, for example, metal materials such as nickel (Ni) and stainless steel, a polyimide resin, and the like are used for the base layer.

In some embodiments, the elastic layer is an elastic layer that improves fixability. For example, an elastic body such as silicone rubber is used for the elastic layer.

In some embodiments, the surface release layer is an outermost layer in contact with the pressure roller 420. For example, a tetrafluoroethylene-perfluoroalkyl vinyl ether copolymer (PFA) resin tube is used for the surface release layer.

Here, in order to reduce warming-up time, it is desirable that both the elastic layer and the surface release layer have a predetermined thickness so that heat capacity is not too high. Various sizes of the heating belt 411 in at least one exemplary embodiment are listed below.

The heating belt 411: inner diameter of approximately 30 mm.

Thickness of the base layer: approximately 40 μm.

Thickness of the elastic layer: approximately 200 μm

Thickness of the release layer: approximately 30 μm.

The inside of the base layer may be coated to improve a friction sliding property with the heating member.

A heating unit 412 is disposed inside the heating belt 411. The heating unit 412 is supported by a support member 415. The heating unit 412 includes a heater 413 and a heater holding member 414 that holds the heater 413.

A detailed configuration of the heater 413 will be described later with reference to FIGS. 5 and 6. The heater holding member 414 includes a member having a gutter-shaped cross section having rigidity, heat resistance, and heat insulation properties. In some embodiments, the heater holding member 414 uses elastic materials such as silicone rubber, fluorine rubber, and the like, and heat-resistant resins such as a polyimide resin, polyphenylene sulfide (PPS), polyether sulfone (PES), a liquid crystal polymer, and the like. The heater holding member 414 supports the inner surface of the heating belt 411 and also supports one surface of the heater 413.

The fixing unit 40 includes thermistors 416 and 417. The thermistor 416 detects a temperature of the heater 413. The thermistor 417 detects a temperature of the inner surface of the heating belt 411.

The pressure roller 420 includes a core metal 421, an elastic layer 422 formed on an outside of the core metal 421, and a release layer 423 formed on an outside of the elastic layer 422. For example, stainless steel is used for the core metal 421. For example, injection-molded silicone rubber is used for the elastic layer 422. For example, the tetrafluoroethylene-perfluoroalkyl vinyl ether copolymer (PFA) resin tube is used for the release layer 423.

Various sizes of the pressure roller 420 according to at least one exemplary embodiment are listed below.

External shape of the pressure roller 420: approximately 30 mm

Outer diameter of the core metal 421: approximately 14 mm

Thickness of the elastic layer 422: approximately 8 mm

Thickness of the release layer 423: approximately 30 μm.

In some embodiments, for securing the nip area and durability, a hardness of the pressure roller 420 is desirably in a range of approximately 40° to 70° under a weight of 9.8 N (Newton) in a predetermined hardness tester. In at least one embodiment, the hardness of the pressure roller 420 is set to approximately 60°.

A length of the pressure roller 420 in a longitudinal direction (i.e., a horizontal direction in FIG. 4) is, for example, approximately 332 mm, inclusive. The pressure roller 420 is rotatably supported between side plates of an apparatus frame via a bearing member at opposite ends of the core metal 421 in the longitudinal direction, and a rotational force from a drive source is transmitted to rotationally drive the pressure roller 420. The pressure roller is urged by an elastic member such as a spring to press the heating belt 411. The pressure roller 420 can contact the heating belt 411 and can be separated therefrom. Further, when the pressure roller 420 is drive, the pressure roller 420 can prevent creep (e.g., deformation, etc.) of the heating belt 411 and the pressure roller 420 by contacting the heating belt 411.

Figure 5:
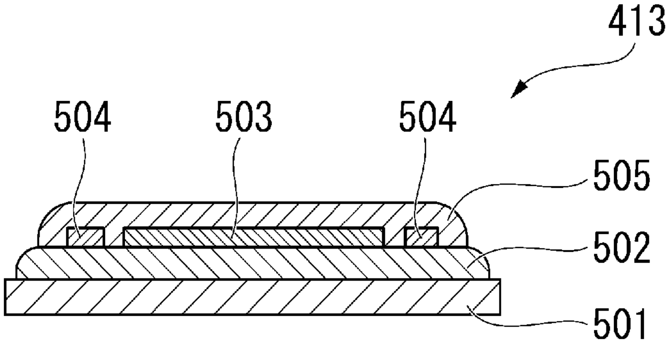
FIG. 5 is a diagram illustrating a heating heater of the image forming apparatus, according to an exemplary embodiment.

FIG. 5 is a diagram illustrating the heater 413 of the image forming apparatus 100, according to an exemplary embodiment. The heater 413 includes a substrate 501, a glass layer 502, a heat generation resistor 503, a conductor 504, and a glass coat 505. A metal material such as stainless steel or a ceramic such as aluminum nitride is used for the substrate 501. The glass layer 502 is an insulation layer provided on the substrate 501. In some embodiments, the heat generation resistor 503 is provided on the glass layer 502 and is formed by screen printing and the like with silver, a palladium alloy, and the like.

In some embodiment, silver and the like are used for the conductor 504. The conductor 504 is connected to electrical contact units 601*a*, 601*b*, and 601*c* (refer to FIG. 6). The glass coat 505 is formed as a protective layer on the heat generation resistor 503. The glass coat 505 protects the heat generation resistor 503 and improves a sliding property with the heating belt 411.

Figure 6:
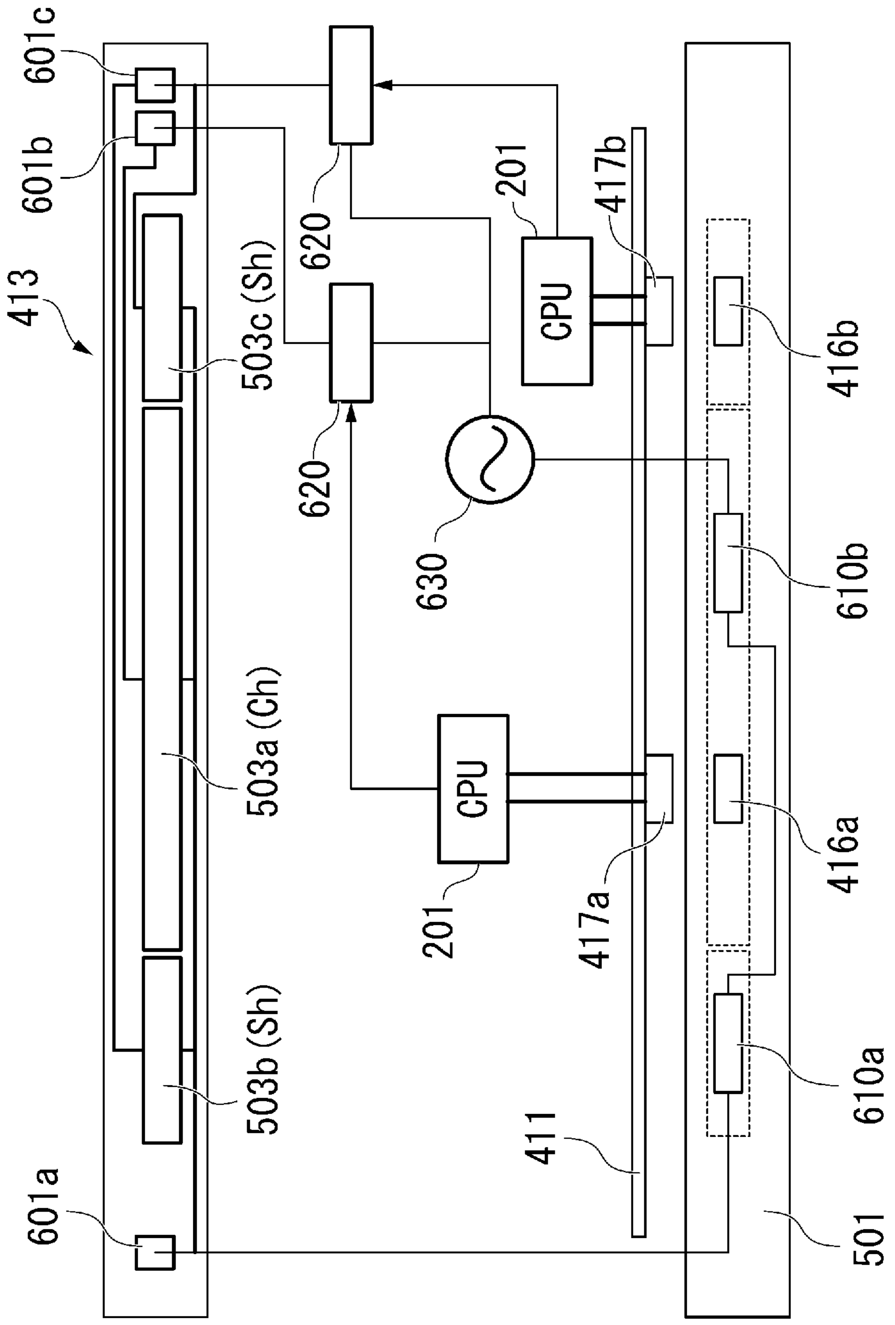
FIG. 6 is a diagram illustrating an internal configuration of the heating heater of FIG. 5.

FIG. 6 is a diagram illustrating an internal configuration of the heater 413 of FIG. 5. The heater 413 includes a first heat generation resistor 503*a*, a second heat generation resistor 503*b*, and a third heat generation resistor 503*c*. The first heat generation resistor 503*a* is provided in a central portion of the heater 413. The second heat generation resistor 503*b* is disposed on one side of the first heat generation resistor 503*a*. The third heat generation resistor 503*c* is disposed on an other side of the first heat generation resistor 503*a*.

Hereinafter, the first heat generation resistor 503*a* is referred to as a "center heater Ch". The second heat generation resistor 503*b* and the third heat generation resistor 503*c* are referred to as "side heaters Sh". The side heaters Sh are connected to a power source in parallel with the center heater Ch, thereby making it possible to control energization independently.

In some embodiments, for example, a resistance value of the center heater Ch is smaller than that of the side heater Sh. The resistance values of the side heaters Sh (the second heat generation resistor 503*b* and third heat generation resistor 503*c*) are approximately the same as each other, respectively. A resistance value ratio between the center heater Ch and the side heater Sh may be in a range of approximately 3:1 to 7:1, desirably in a range of 4:1 to 6:1.

The heater holding member 414 includes a through hole. Referring to FIG. 6, thermistors 416*a* and 416*b* and thermostats 610*a* and 610*b*, serving as safety elements, are respectively disposed within the through hole so as to contact the heater 413. The thermostats 610*a* and 610*b* are connected to each other in series, detect abnormal heat generation of each heater if a temperature of each heater rises abnormally, and cut off energization of each heater.

Next, control of an amount of power supplied to the heater 413 will be described. In some embodiments, the CPU 201 turns on a three terminal semiconductor 620 (e.g., a TRIAC™, etc.) which is a semiconductor switching element, and energizes the center heater Ch and the side heater Sh from a commercial power source 630 via the electrical contact units 601*a*, 601*b*, and 601*c* of the heater 413 to raise the temperature of each heater. Next, thermistors 417*a* and 417*b* detect the temperature of each heater, perform analog-to-digital (A/D) conversion of a detection result, and output the converted detection result to the CPU 201.

The CPU 201 performs phase control or wave number control of the power supplied to the center heater Ch and the side heater Sh by the three terminal semiconductor 620 based on temperature information transmitted from the thermistors 417*a* and 417*b*. The thermostats 610*a* and 610*b* cut off a current flowing from the commercial power source 630 to the center heater Ch and the side heater Sh if the temperature of each heater rises abnormally, regardless of the control of the CPU 201.

In some embodiments, the heater 413 is controlled so that the thermistors 417*a* and 417*b* have substantially the same temperature during the warming-up, thereby making it possible to handle a sheet St having varying sizes. Specifically, in some embodiments, the thermistors 417*a* and 417*b* are set to a target temperature of 115° C., inclusive.

On the other hand, in at least one embodiment, the sheet St of the image forming apparatus 100 is set, thereby making it possible to change the target temperature of the thermistors 417*a* and 417*b* during the warming-up. Specifically, by setting the target temperature of the thermistor 417*b* to be substantially the same as or lower than that of the thermistor 417*a*, the heating control during a warming-up operation is performed.

Next, a table stored in the memory 202 will be described with reference to FIGS. 7 and 8.

Figures 7, 8, 9:
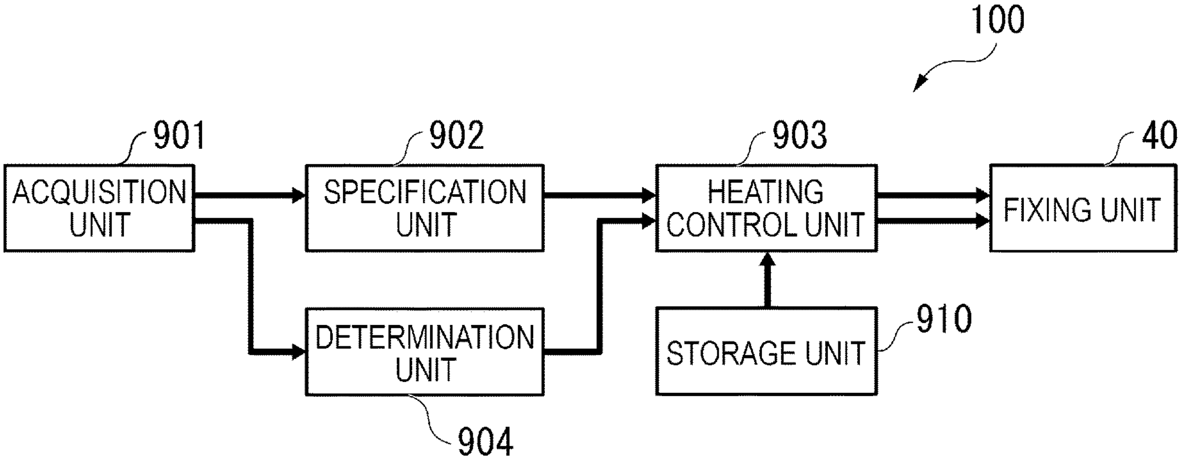
FIG. 7 is a table illustrating a cassette-sheet size correspondence table TB1 in which a paper feed cassette and a sheet size are associated with each other, according to an exemplary embodiment.
FIG. 8 is a table illustrating a cassette-temperature correspondence table TB2 in which the paper feed cassette and temperature information are associated with each other, according to an exemplary embodiment.
FIG. 9 is a block diagram illustrating a functional configuration of the image forming apparatus, according to an exemplary embodiment.

FIG. 7 is a table illustrating a cassette-sheet size correspondence table TB1 in which a paper feed cassette and a sheet size are associated with each other, according to an exemplary embodiment. The cassette-sheet size correspondence table TB1 includes items of the paper feed cassette and the sheet size. The item of the paper feed cassette further includes items of a paper feed cassette ID and a sheet storage capacity.

The paper feed cassette ID indicates "a", "b", and "c". The paper feed cassette ID "a" corresponds to the paper feed cassette 141*a*. The paper feed cassette ID "b" corresponds to the paper feed cassette 141*b*. The paper feed cassette ID "c" corresponds to the paper feed cassette 141*c*. The sheet storage capacity indicates the maximum number of sheets St that can be stored. The sheet size (e.g., type information of the sheet St, etc.) indicates a size of the sheet St.

Specifically, in some embodiments of the cassette-sheet size correspondence table TB1, the paper feed cassette ID "a" indicates that the sheet storage capacity is approximately 1,500 sheets and that A4 size copy paper is stored. The paper feed cassette ID "b" indicates that the sheet storage capacity is approximately 1,000 sheets and that A3 size copy paper is stored. The paper feed cassette ID "c" indicates that the sheet storage capacity is approximately 1,000 sheets and that A5 size copy paper is stored. In at least one embodiment, a size exceeding the A4 size (A3, B4, and the like) is defined as a large size, and a size equal to or smaller than the A4 size (A4, B5, A5, and the like) is defined as a small size.

FIG. 8 is a table illustrating a cassette-temperature correspondence table TB2 in which the paper feed cassette and temperature information are associated with each other, according to an exemplary embodiment. The cassette-temperature correspondence table TB2 is a table used for temperature control of the fixing unit 40. The cassette-temperature correspondence table TB2 includes items of the paper feed cassette and temperature information. The temperature information further includes items of a temperature pattern, a center heater temperature, and a side heater temperature.

In some embodiments, the temperature pattern indicates a combination of the center heater temperature and the side heater temperature. The center heater temperature indicates a temperature (a high temperature or a low temperature) of the center heater Ch. The side heater temperature indicates a temperature (a high temperature or a low temperature) of the side heater Sh.

Referring to FIG. 8, the cassette-temperature correspondence table TB2 is specifically described below. In some embodiments, when printing the sheet St of the paper feed cassette ID "a" or the sheet St of the paper feed cassette ID "c", that is, when printing a small-sized sheet St, the temperature control is performed based on the temperature pattern A, the temperature pattern A including the center heater temperature being the high temperature and the side heater temperature being the low temperature. In some embodiments, when printing the sheet St of the paper feed cassette ID "b", that is, when printing a large-sized sheet St, the temperature control is performed based on the temperature pattern B, the temperature pattern B including the center heater temperature being the high temperature and the side heater temperature being the high temperature.

In at least one embodiment, while the type of the sheet St is defined by the sheet size, the type of the sheet St can also be defined by a basis weight of the sheet St. In this case, the temperature pattern A may be associated with the paper feed cassette 141 that stores the sheet St of which the basis weight is less than a predetermined value. The temperature pattern B may be associated with the paper feed cassette 141 that stores the sheet St of which the basis weight is equal to or greater than the predetermined value.

FIG. 9 is a block diagram illustrating a functional configuration of the image forming apparatus 100, according to an exemplary embodiment. The image forming apparatus 100 includes an acquisition unit 901, a specification unit 902, a heating control unit 903, a determination unit 904, a storage unit 910, and the fixing unit 40. The respective units 901 to 904 are implemented by the CPU 201. That is, functions of the respective units 901 to 904 are implemented by allowing the CPU 201 to execute a predetermined program stored in the memory. The processing according to the embodiment can be performed not only by allowing the CPU 201 to execute the program, but also by using, for example, hardware (e.g., a circuit unit including circuitry, etc.) such as large scale integration (LSI), an application specific integrated circuit (ASIC), a field-programmable gate array (FPGA), a graphics processing unit (GPU), and the like. The processing according to some exemplary embodiments can also be performed by a combination of software and hardware. The storage unit 910 is implemented by the memory 202.

The storage unit 910 stores temperature information that is related to the temperature control of the fixing unit 40 and is associated with each sheet storage unit 140 (the paper feed cassettes 141*a*, 141*b*, and 141*c*). Specifically, the storage unit 910 stores the cassette-temperature correspondence table TB2.

The acquisition unit 901 acquires the type information of the sheet St to be printed. The type information of the sheet St is, for example, sheet size information. The acquisition unit 901 acquires the sheet size information based on an operation input received from a user by the control panel 120 during, for example, copying and facsimile (FAX), and a printing job received from another apparatus by the communication unit 203.

In some embodiments, the warming-up is a preparatory operation when the image forming apparatus 100 returns from a sleep mode in which the image forming apparatus 100 is not used for a certain period of time. Non-limiting examples of conditions under which the warming-up starts are described below.

(1) Receiving the printing job from another apparatus.

(2) Operation of the control panel 120 (e.g., by a start button, etc.).

(3) Placing a document on the document tray of the automatic document feed apparatus.

(4) If the image forming apparatus 100 includes a human detection sensor, detecting a user by a human detection sensor.

(5) Mounting a storage medium such as a universal serial bus (USB) memory on the image forming apparatus 100.

(6) Opening a document cover provided in the image reading unit 150.

For example, in the case of the condition (1), since the printing job includes the sheet size information, the acquisition unit 901 acquires the sheet size information at a timing when the printing job is received. On the other hand, in the cases of the conditions (2) to (6), the acquisition unit 901 may not be able to acquire the sheet size information at the start of the warming-up. In the following, satisfying this condition (the acquisition unit 901 cannot acquire the sheet size information at the start of the warming-up) is referred to as "satisfaction of a predetermined condition".

In the case of the satisfaction of the predetermined condition, if heating is performed according to the large size by using the center heater Ch and the side heater Sh, as a result, if the small-sized sheet St is printed, it is not required to perform the heating corresponding to the large size, such that power consumption during the warming-up increases.

Therefore, if the predetermined condition is satisfied, the specification unit 902 specifies any one of the paper feed cassettes 141*a*, 141*b*, and 141*c* storing the sheet St to be printed. In at least one embodiment, if the predetermined condition is satisfied, the specification unit 902 specifies the paper feed cassette 141 having the largest storage capacity (for example, the paper feed cassette 141*a*) as the paper feed cassette 141 that stores the sheet St having a high possibility to be used.

The heating control unit 903 performs a first heating control for controlling the temperature of the fixing unit 40, based on the temperature information (for example, the temperature pattern A) associated with the sheet storage unit 140 (for example, the paper feed cassette 141*a*) specified by the specification unit 902 of the cassette-temperature correspondence table TB2 stored in the storage unit 910.

After the first heating control starts, that is, after the warming-up starts, the sheet size information is acquired by the acquisition unit 901 according to the start of an operation related to printing. Specifically, the sheet size information is acquired by selecting the sheet size from the control panel 120, reading the document sent out from the automatic document feed apparatus by the scanner apparatus, and acquiring the printing job from the storage medium.

If the sheet size information is acquired by the acquisition unit 901 after the warming-up starts, the determination unit 904 determines whether or not the paper feed cassette 141 that stores the sheet St indicated by the sheet size information and the specified paper feed cassette 141 match each other.

The heating control unit 903 performs the heating control in accordance with a determination result of the determination unit 904. Specifically, if the determination unit 904 determines that the two paper feed cassettes 141 match each other (affirmative determination), the heating control unit 903 continuously performs the first heating control. On the other hand, if the determination unit 904 determines that the two paper feed cassettes 141 do not match each other (negative determination), the heating control unit 903 performs a second heating control for controlling the temperature of the fixing unit 40, based on the temperature information (the temperature pattern) associated with the paper feed cassette 141 (the paper feed cassette ID) that stores the sheet St indicated by the sheet size information.

Hereinafter, the first heating control and the second heating control performed in the fixing unit 40 during the warming-up will be described with reference to specific examples using FIGS. 10 to 13.

Figure 10:
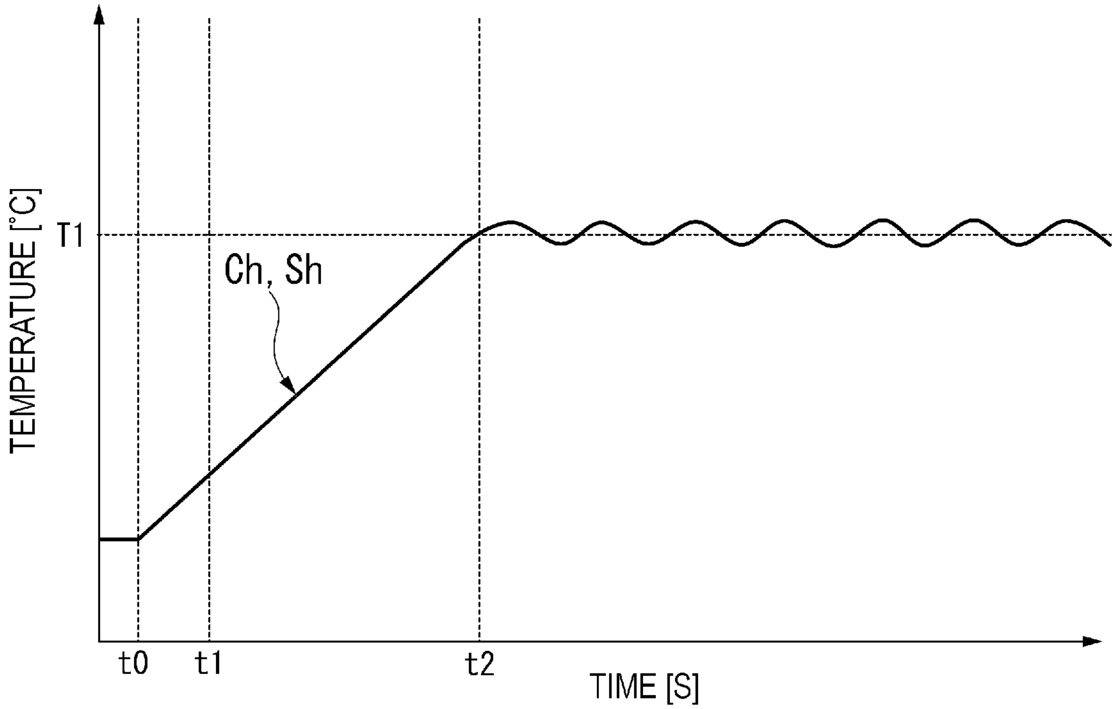
FIG. 10 is a graph illustrating a control temperature in which a heating control starts with a temperature pattern B based on a large-sized sheet St as a first heating control which is continuously performed thereafter, according to an exemplary embodiment.

FIG. 10 is a graph illustrating a control temperature in which a heating control starts with a temperature pattern B based on a large-sized sheet St as a first heating control which is continuously performed thereafter, according to an exemplary embodiment.

In FIG. 10, a horizontal axis represents time (seconds) and a vertical axis represents temperature (° C.). Time t0 is a timing at which the warming-up starts. If the paper feed cassette 141 storing the large-sized sheet St is specified by the specification unit 902, after the time to, both the center heater Ch and the side heater Sh are heated and controlled (the first heating control) so as to reach a target temperature T1 (a high temperature) based on the temperature pattern B.

The time t1 is a timing at which the determination unit 904 acquires a determination result of the affirmative determination. After the time t1, both the center heater Ch and the side heater Sh are heated and controlled so as to reach the target temperature T1 based on the temperature pattern B. That is, the first heating control is continuously performed.

Time t2 is a timing at which the warming-up is finished. After the time t2, the center heater Ch and the side heater Sh are heated and controlled based on the temperature respectively detected by the thermistors 417*a* and 417*b*.

Figure 11:
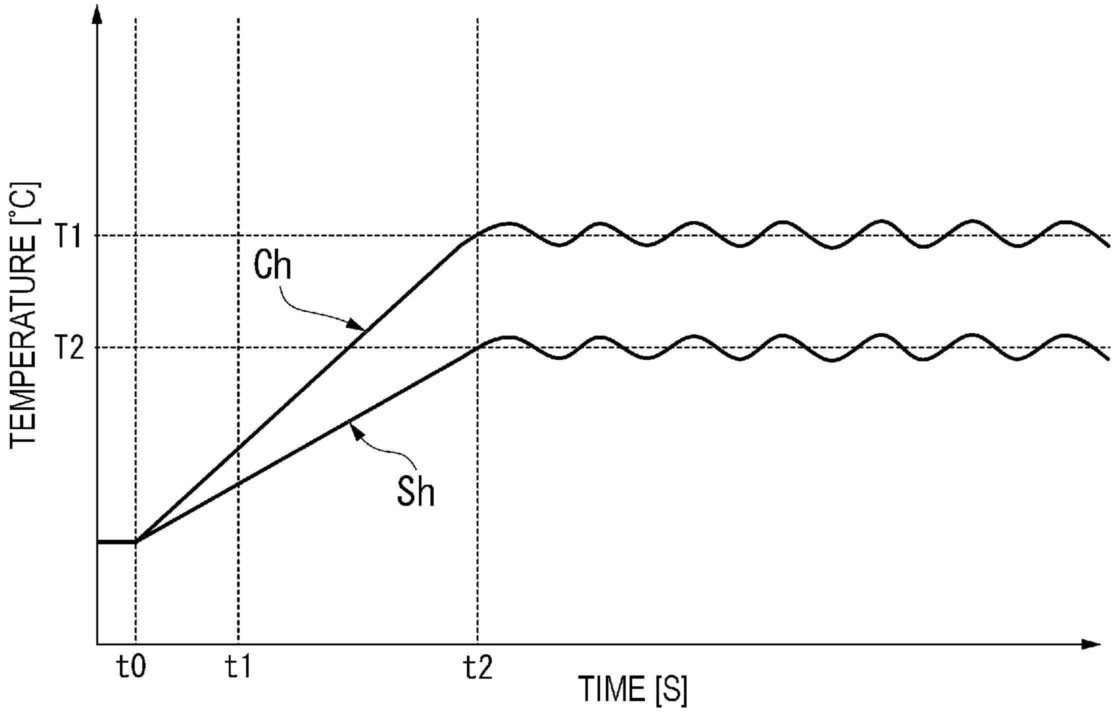
FIG. 11 is a graph illustrating the control temperature in which the heating control starts with a temperature pattern A based on a small-sized sheet St as the first heating control which is continuously performed thereafter, according to an exemplary embodiment.

FIG. 11 is a graph illustrating the control temperature in which the heating control starts with a temperature pattern A based on a small-sized sheet St as the first heating control which is continuously performed thereafter, according to an exemplary embodiment. If the specification unit 902 specifies the paper feed cassette 141 storing the small-sized sheet St, after the time to, based on the temperature pattern A, the center heater Ch is heated and controlled so as to reach the target temperature T1 (the high temperature), and the side heater Sh is heated and controlled so as to reach a target temperature T2 (a low temperature) (the first heating control).

The time t1 is a timing at which the determination unit 904 acquires the determination result of the affirmative determination. After the time t1, based on the temperature pattern A, the center heater Ch is heated and controlled so as to reach the target temperature T1, and the side heater Sh is heated and controlled so as to reach the target temperature T2. That is, the first heating control is continuously performed.

Next, after the time t2, the center heater Ch is heated and controlled at the target temperature T1 based on a temperature detected by the thermistor 417*a*. After the time t2, the side heater Sh is heated and controlled at the target temperature T2 based on a temperature detected by the thermistor 417*b*.

Figure 12:
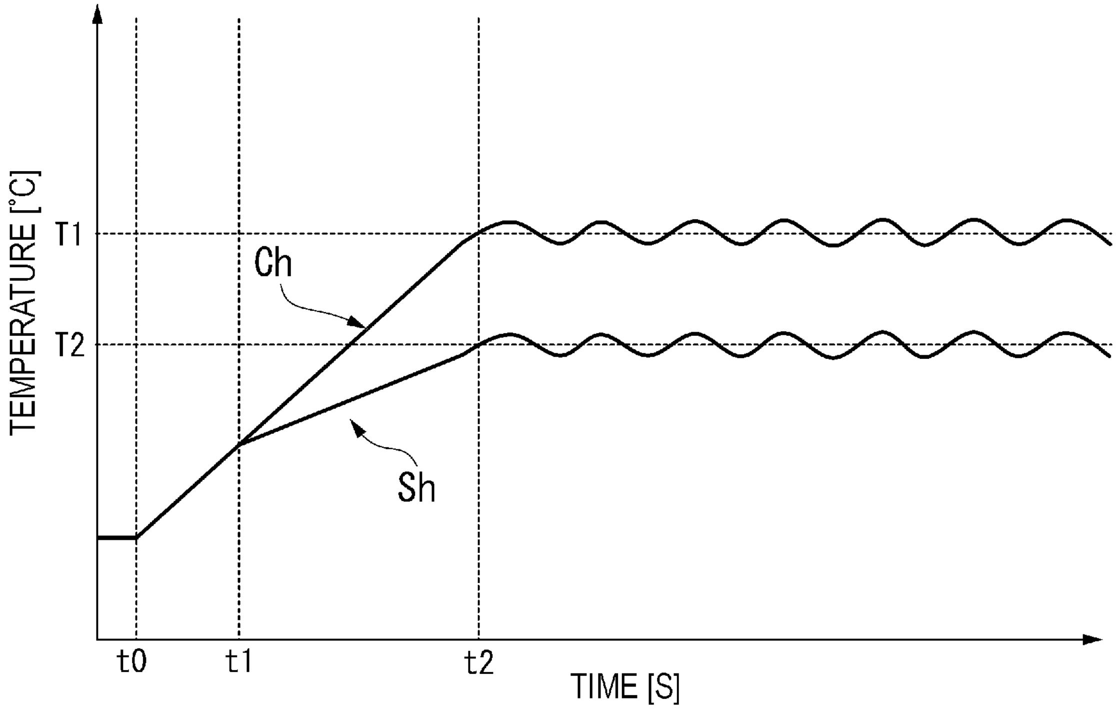
FIG. 12 is a graph illustrating the control temperature in which the heating control starts with the temperature pattern B based on the large-sized sheet St as the first heating control and then is switched to the temperature pattern A (second heating control), according to an exemplary embodiment.

FIG. 12 is a graph illustrating the control temperature in which the heating control starts with the temperature pattern B based on the large-sized sheet St as the first heating control and then is switched to the temperature pattern A (second heating control), according to an exemplary embodiment. If the specification unit 902 specifies the paper feed cassette 141 storing the large-sized sheet St, after the time t0, both the center heater Ch and the side heater Sh are heated and controlled so as to reach the target temperature T1 based on the temperature pattern B.

The time t1 is a timing at which the determination unit 904 acquires the determination result of the negative determination. After the time t1, the center heater Ch is heated and controlled so as to reach the target temperature T1 based on the temperature pattern A. After the time t1, the side heater Sh is heated and controlled so as to reach the target temperature T2 based on the temperature pattern A (the second heating control).

Next, after the time t2, the center heater Ch is heated and controlled at the target temperature T1 based on the temperature detected by the thermistor 417*a*. After the time t2, the side heater Sh is heated and controlled at the target temperature T2 based on the temperature detected by the thermistor 417*b*.

Figure 13:
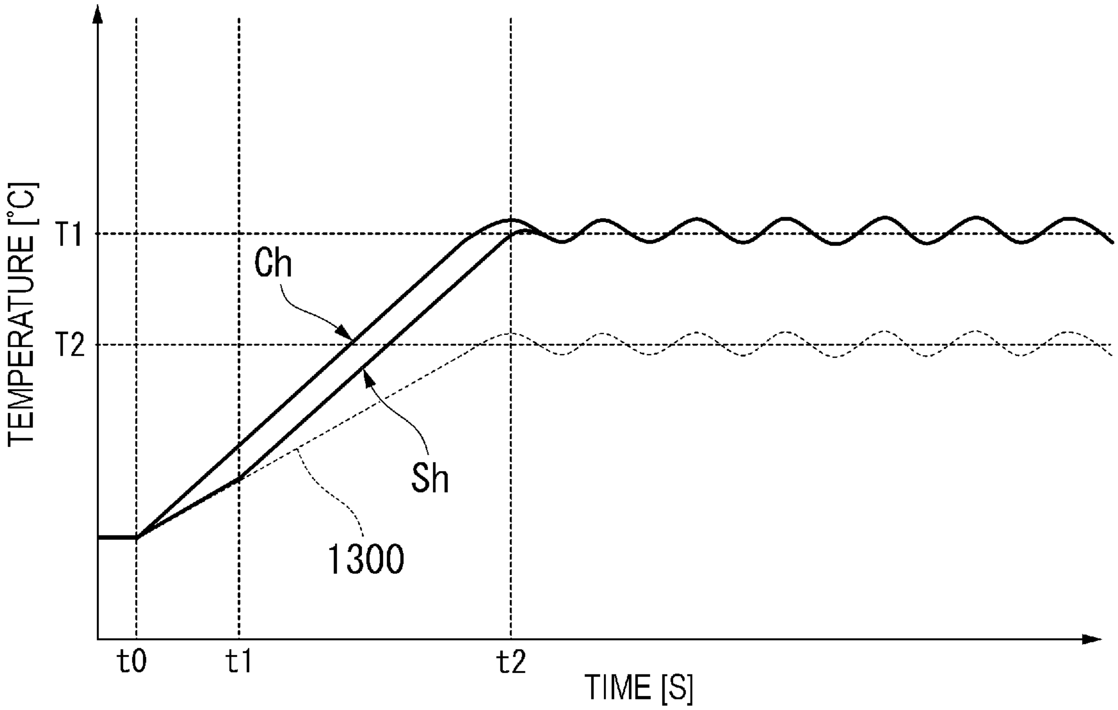
FIG. 13 is a graph illustrating the control temperature in which the heating control starts with the temperature pattern A based on the small-sized sheet St as the first heating control and then is switched to the temperature pattern B (the second heating control), according to an exemplary embodiment.

FIG. 13 is a graph illustrating the control temperature in which the heating control starts with the temperature pattern A based on the small-sized sheet St as the first heating control and then is switched to the temperature pattern B (the second heating control), according to an exemplary embodiment. If the specification unit 902 specifies the paper feed cassette 141 storing the small-sized sheet St, after the time t0, based on the temperature pattern A, the center heater Ch is heated and controlled so as to reach the target temperature T1, and the side heater Sh is heated and controlled so as to reach the target temperature T2.

The time t1 is a timing at which the determination unit 904 acquires the determination result of the negative determination. After the time t1, the center heater Ch and the side heater Sh are heated and controlled so as to reach the target temperature T1 based on the temperature pattern B (the second heating control). In FIG. 13, a broken line 1300 indicates a hypothetical temperature if the side heater Sh is heated and controlled based on the temperature pattern A (the first heating control).

Next, after the time t2, the center heater Ch and the side heater Sh are heated and controlled at the target temperature T1 based on the temperatures respectively detected by the thermistors 417*a* and 417*b*.

Next, processing related to the fixing unit 40 during the warming-up performed by the image forming apparatus 100 will be described with reference to FIG. 14.

Figure 14:
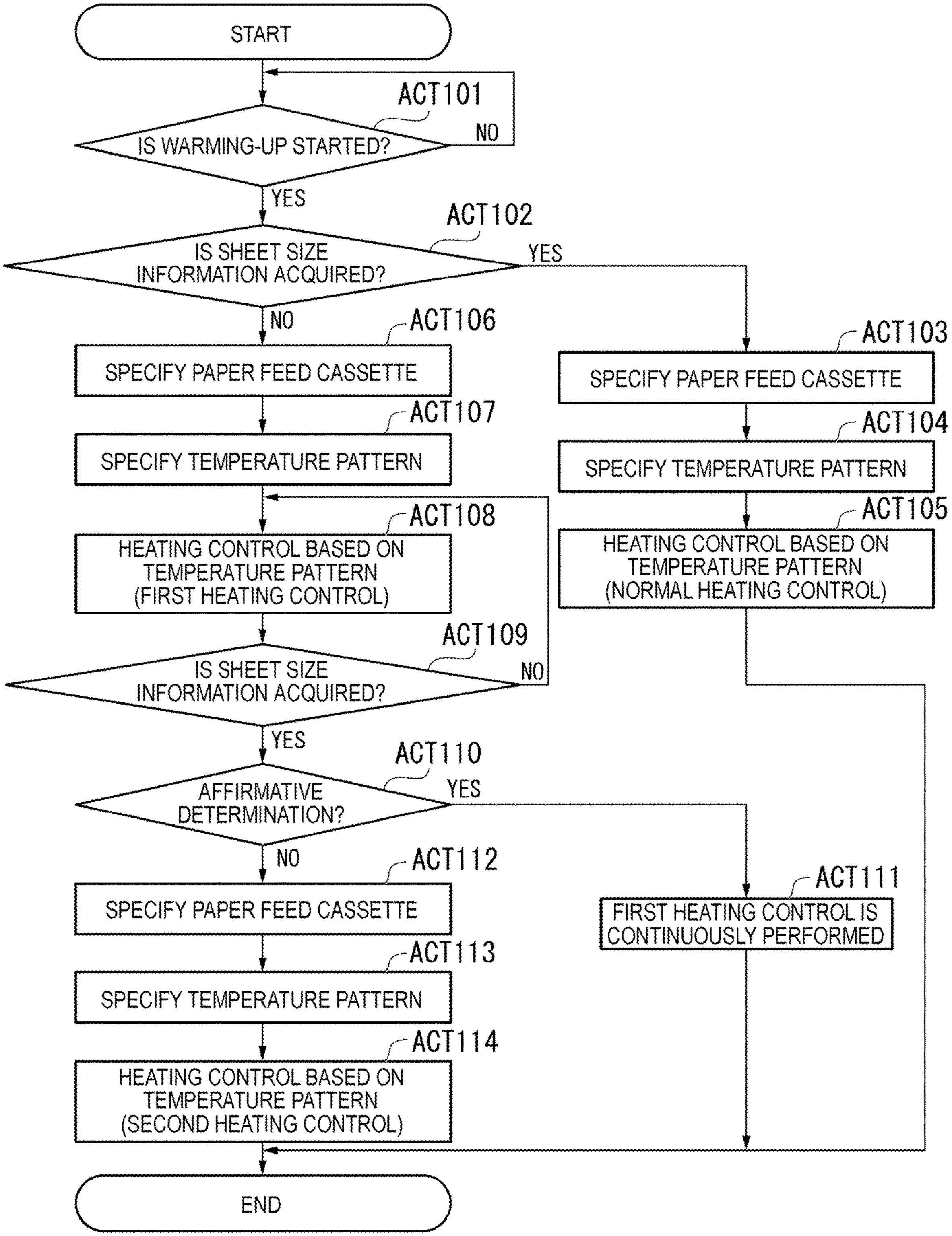
FIG. 14 is a flowchart illustrating a heating process in which a target temperature is reached during warming-up, according to an exemplary embodiment.

FIG. 14 is a flowchart illustrating a heating process in which a target temperature is reached during warming-up, according to an exemplary embodiment. In FIG. 14, the image forming apparatus 100 determines whether or not the warming-up starts (ACT 101). The image forming apparatus 100 waits until the warming-up starts (ACT 101: NO), and if the warming-up starts (ACT 101: YES), the image forming apparatus 100 determines whether or not sheet size information is acquired by the acquisition unit 901 (ACT 102).

If the sheet size information is already acquired (ACT 102: YES), the image forming apparatus 100 refers to the cassette-sheet size correspondence table TB1 (refer to FIG. 7), and specifies any one of the paper feed cassettes 141*a*, 141*b*, and 141*c* that store the sheet St indicated by the sheet size information (ACT 103).

Next, the image forming apparatus 100 refers to the cassette-temperature correspondence table TB2 (refer to FIG. 8), and specifies a temperature pattern corresponding to the specified paper feed cassette 141 (ACT 104). Next, the image forming apparatus 100 performs heating control (normal heating control) based on the specified temperature pattern (ACT 105), and terminates a series of processing.

On the other hand, if the sheet size information is not acquired in ACT 102 (ACT 102: NO), the image forming apparatus 100 specifies the paper feed cassette 141 having the largest storage capacity (for example, the paper feed cassette 141*a*) (ACT 106). Next, the image forming apparatus 100 refers to the cassette-temperature correspondence table TB2 (as seen in FIG. 8), and specifies the temperature pattern (for example, the temperature pattern A) corresponding to the specified paper feed cassette 141 (ACT 107). Next, the image forming apparatus 100 performs the heating control (the first heating control) based on the specified temperature pattern (ACT 108). Next, the image forming apparatus 100 determines whether or not the sheet size information is acquired by the acquisition unit 901 (ACT 109).

If the sheet size information is not acquired by the acquisition unit 901 (ACT 109: NO), the image forming apparatus 100 returns to ACT 108 and continuously performs the first heating control. If the sheet size information is acquired by the acquisition unit 901 (ACT 109: YES), the image forming apparatus 100 determines whether or not the determination unit 904 acquires a determination result of affirmative determination (ACT 110). If the determination result of the affirmative determination is acquired (ACT 110: YES), the image forming apparatus 100 continuously performs the first heating control (ACT 111), and terminates a series of processing.

In ACT 110, if the determination result of the affirmative determination is not acquired (ACT 110: NO), that is, if a determination result of negative determination is acquired, the image forming apparatus 100 refers to the cassette-sheet size correspondence table TB1 (as seen in FIG. 7), and specifies any one of the paper feed cassettes 141*a*, 141*b*, and 141*c* that store the sheet St indicated by the sheet size information acquired in ACT 109 (ACT 112).

Next, the image forming apparatus 100 refers to the cassette-temperature correspondence table TB2 (refer to FIG. 8), and specifies a temperature pattern corresponding to the specified paper feed cassette 141 (ACT 113). Next, the image forming apparatus 100 performs the heating control (the second heating control) based on the specified temperature pattern (ACT 114), and terminates a series of processing.

In at least one embodiment, the fixing unit 40 includes, as the center heater Ch and the side heater Sh, three heat generation resistors 503 including the first heat generation resistor 503*a*, the second heat generation resistor 503*b*, and the third heat generation resistor 503*c*. However, the number of heat generation resistors is not limited to three, and may be two or more. In at least one embodiment, the temperature pattern is set to two temperature patterns in which the temperature of the side heater Sh is set to the high temperature or the low temperature, and may be set to three or more temperature patterns. However, each temperature pattern is configured to be associated with the paper feed cassette ID.

As described above, if the predetermined condition is satisfied (if the sheet size information is not acquired at the start of the warming-up), the image forming apparatus 100 according to at least one embodiment specifies the paper feed cassette 141 storing the sheet St to be printed, and controls the temperature of the fixing unit 40 (the first heating control) based on the temperature information associated with the specified paper feed cassette 141. Accordingly, even though the size of the sheet St to be printed is unknown before the start of the warming-up, the fixing unit 40 can be heated and controlled based on the temperature information associated with the paper feed cassette 141 that stores the sheet St having a high possibility to be used. Therefore, during the warming-up, the heating control according to the small size can be performed, that is, the heating control according to the large size is not always performed, thereby making it possible to prevent power consumption during the warming-up. Therefore, according to the embodiment, the fixing unit 40 can efficiently reach the target temperature.

If the sheet size information is acquired after the start of the warming-up, the image forming apparatus 100 according to at least one embodiment performs the heating control in accordance with the determination result of whether or not the paper feed cassette 141 that stores the sheet St indicated by the sheet size information and the paper feed cassette 141 specified at the start of the warming-up match each other. Accordingly, since the heating control can be switched during the warming-up, the fixing unit 40 can efficiently reach the target temperature.

The image forming apparatus 100 according to at least one embodiment continuously performs the first heating control if the determination result of the affirmative determination is acquired. Accordingly, the fixing unit 40 can reach the target temperature most efficiently.

If the determination result of the negative determination is acquired, the image forming apparatus 100 according to at least one embodiment controls the temperature of the fixing unit 40 based on the temperature information associated with the paper feed cassette 141 that stores the sheet indicated by the sheet size information acquired after the warming-up. Accordingly, after the start of the warming-up, it is possible to switch to the heating control in accordance with the sheet St to be actually used, such that the fixing unit 40 can efficiently reach the target temperature.

If the predetermined condition is satisfied, the image forming apparatus 100 according to at least one embodiment specifies the paper feed cassette 141 having the largest storage capacity. Accordingly, it is possible to efficiently specify the paper feed cassette 141 that stores the sheet St having a high possibility to be used. Therefore, during the warming-up, the fixing unit 40 can efficiently reach the target temperature based on the sheet St having a high possibility to be used.

Next, example modifications of exemplary, non-limiting embodiments will be described. In each of the following modifications, the contents described in the above-described embodiment will be appropriately omitted. First, a first modification of the embodiment will be described. In the above-described embodiment, if the predetermined condition is satisfied, the paper feed cassette 141 having the largest storage capacity is configured to be specified. In the first modification, if the predetermined condition is satisfied, the paper feed cassette 141 is configured to be specified based on an arrangement location of the paper feed cassette 141.

FIG. 15 is a table illustrating a cassette-sheet size correspondence table TB3 in which the paper feed cassette and the sheet size are associated with each other, according to an exemplary embodiment. The cassette-sheet size correspondence table TB3 includes items of the paper feed cassette and the sheet size. The item of the paper feed cassette further includes items of the paper feed cassette ID and a location.

The location indicates a location in a height direction of the paper feed cassettes 141*a*, 141*b*, and 141*c*. As illustrated in FIG. 1, the paper feed cassettes 141*a*, 141*b*, and 141*c* are disposed at locations different in the height direction. The paper feed cassette 141*a* corresponding to the paper feed cassette ID “a” is disposed at a “high” location, the “high” location being the uppermost stage. The paper feed cassette 141*c* corresponding to the paper feed cassette ID “c” is disposed at a “low” location, the “low” location being the lowermost stage. The paper feed cassette 141*b* corresponding to the paper feed cassette ID “b” is disposed at a “middle” location, the “middle” location being between the “high” location and the “low” location.

Specifically, regarding the description of the cassette-sheet size correspondence table TB3, the paper feed cassette ID “a” is disposed at the location of the uppermost stage, and stores A4 size copy paper. The paper feed cassette ID “b” is disposed at the location of the middle, and stores A3 size copy paper. The paper feed cassette ID “c” is disposed at the location of the lowermost stage, and stores A5 size copy paper.

In the first modification, if the predetermined condition is satisfied, the specification unit 902 specifies the paper feed cassette 141 (the paper feed cassette 141*a*) disposed at the top as the paper feed cassette 141 that stores the sheet St having a high possibility to be used.

According to the first modification, it is possible to efficiently specify the paper feed cassette 141 that stores the sheet St having a high possibility to be used. Therefore, during the warming-up, the fixing unit 40 can efficiently reach the target temperature based on the sheet St having a high possibility to be used.

Next, a second modification of the above-described embodiment will be described. In the second modification, if the predetermined condition is satisfied, the paper feed cassette 141 is configured to be specified based on the number of paper feed cassettes 141 storing the sheets St having the same size among the plurality of paper feed cassettes 141.

FIG. 16 is a table illustrating a cassette-cassette number correspondence table TB4 in which the paper feed cassette and the sheet size are associated with each other, according to an exemplary embodiment. The cassette-cassette number correspondence table TB4 includes items of the paper feed cassette and the number of cassettes storing the sheets having the same size. The item of the paper feed cassette further includes items of the paper feed cassette ID and a sheet size. The sheet size (e.g., sheet type information, etc.) is a size of the sheet St to be stored.

The number of cassettes storing the sheets having the same size indicates the total number of paper feed cassettes 141 storing the sheets St having the same size.

Specifically, the sheet sizes of the paper feed cassette IDs “a” and “b” are both “A4”. That is, the sheet size of “A4” is stored in the two paper feed cassettes 141*a* and 141*b*. Therefore, the number of cassettes storing the sheets having the same size corresponding to the paper feed cassette IDs “a” and “b” is “2”.

The sheet size of the paper feed cassette ID “c” is “A3”. The paper feed cassette 141 storing the sheet size of “A3” is only the paper feed cassette 141*c*. Therefore, the number of cassettes storing the sheets having the same size corresponding to the paper feed cassette ID “c” is “1”.

In the second modification, if the predetermined condition is satisfied, the specification unit 902 specifies any one of the paper feed cassettes 141 based on the number of paper feed cassettes 141 storing the sheets St having the same size. Specifically, the specification unit 902 specifies, as the paper feed cassette 141 that stores the sheet St having a high possibility to be used, any one of the paper feed cassettes 141*a* and 141*b* having the largest number of cassettes storing the sheets having the same size. The specification unit 902 may specify any one of the paper feed cassettes 141*a* and 141*b*. Priority order of the paper feed cassettes 141*a* and 141*b* may be set in advance, and any one of the paper feed cassettes 141*a* and 141*b* may be specified according to the priority order thereof.

According to the second modification, it is possible to efficiently specify the paper feed cassette 141 that stores the sheet St having a high possibility to be used. Therefore, during the warming-up, the fixing unit 40 can efficiently reach the target temperature based on the sheet St having a high possibility to be used.

Next, a third modification of the above-described embodiment will be described. In the third modification, if the predetermined condition is satisfied, the paper feed cassette 141 is configured to be specified based on usage history.

FIG. 17 is a table illustrating a cassette-sheet size correspondence table TB5 in which the paper feed cassette and the sheet size are associated with each other, according to an exemplary embodiment. The cassette-sheet size correspondence table TB5 includes items of the paper feed cassette and the sheet size. The item of the paper feed cassette further includes items of the paper feed cassette ID and the usage history.

The usage history shows the history of each paper feed cassette 141 most recently used. In the drawing, when represented by using the paper feed cassette ID, the usage history is in the order of “a”, “b”, and “c” in order from the most recently used one.

In the third modification, if the predetermined condition is satisfied, the specification unit 902 specifies, as the paper feed cassette 141 that stores the sheet St having a high possibility to be used, the paper feed cassette 141*a* with which the most recently used usage history is associated.

According to the third modification, it is possible to efficiently specify the paper feed cassette 141 that stores the sheet St having a high possibility to be used. Therefore, during the warming-up, the fixing unit 40 can efficiently reach the target temperature based on the sheet St having a high possibility to be used.

Next, a fourth modification of the embodiment will be described. In the fourth modification, if the predetermined condition is satisfied, the paper feed cassette 141 is configured to be specified based on frequency of use.

FIG. 18 is a table illustrating a cassette-sheet size correspondence table TB6 in which the paper feed cassette and the sheet size are associated with each other, according to an exemplary embodiment. The cassette-sheet size correspondence table TB6 includes items of the paper feed cassette and the sheet size. The item of the paper feed cassette further includes items of the paper feed cassette ID and the frequency of use.

The frequency of use indicates the number of printed sheets of the sheet St stored in each paper feed cassette 141 in the past predetermined period (for example, 3 days). The frequency of use of the paper feed cassette 141*a* corresponding to the paper feed cassette ID “a” is “1,051 sheets”. The frequency of use of the paper feed cassette 141*b* corresponding to the paper feed cassette ID “b” is “328 sheets”. The frequency of use of the paper feed cassette 141*c* corresponding to the paper feed cassette ID “c” is “234 sheets”.

In the fourth modification, if the predetermined condition is satisfied, the specification unit 902 specifies, as the paper feed cassette 141 that stores the sheet St having a high possibility to be used, the paper feed cassette 141*a* with which the highest frequency of use is associated.

According to the fourth modification, it is possible to efficiently specify the paper feed cassette 141 that stores the sheet St having a high possibility to be used. Therefore, during the warming-up, the fixing unit 40 can efficiently reach the target temperature based on the sheet St having a high possibility to be used.

Next, application of the fourth modification will be described. In the application of the fourth modification, if the predetermined condition is satisfied, the paper feed cassette 141 is specified by any one of specifying the paper feed cassette 141 according to the above-described embodiment and specifying the paper feed cassette 141 shown in the first to third modifications. Specifically, in the application of the fourth modification, if the predetermined condition is satisfied, the specification unit 902 has the following four modes for specifying the paper feed cassette 141.

(A) Specifying the paper feed cassette 141 having the largest storage capacity (a mode of the embodiment).

(B) Specifying the paper feed cassette 141 disposed at the top (a mode of the first modification).

(C) Specifying the paper feed cassette 141 based on the number of paper feed cassettes 141 storing the sheets St having the same size (a mode of the second modification).

(D) Specifying the paper feed cassette 141 with which the most recently used usage history is associated (a mode of the third modification).

Among the four modes described above, the application of the fourth modification sets any one of the modes (A) to (D) in which the mode used for specifying the paper feed cassette 141 has the highest frequency of use. Specifically, for example, in a past predetermined period (for example, 3 days), any one of the modes (A) to (D) is set based on the mode in which the paper feed cassette 141 is most specified. For example, in the predetermined period of the past 3 days, if the specific mode according to (B) is the mode in which the paper feed cassette 141 is most specified, (B) is set, and if the specific mode according to (B) is the mode in which the paper feed cassette 141 is most specified in the subsequent predetermined period, (B) is set. As described above, in the fourth modification, contents to be set can be periodically updated.

Accordingly, it is possible to efficiently specify the paper feed cassette 141 that stores the sheet St having a high possibility to be used. Therefore, during the warming-up, the fixing unit 40 can efficiently reach the target temperature based on the sheet St having a high possibility to be used.

Next, a fifth modification of the embodiment will be described. The fifth modification describes a modification of the temperature control if the heating control starts with the temperature pattern A based on the small-sized sheet St and then the determination unit 904 determines the negative determination.

Figure 19:
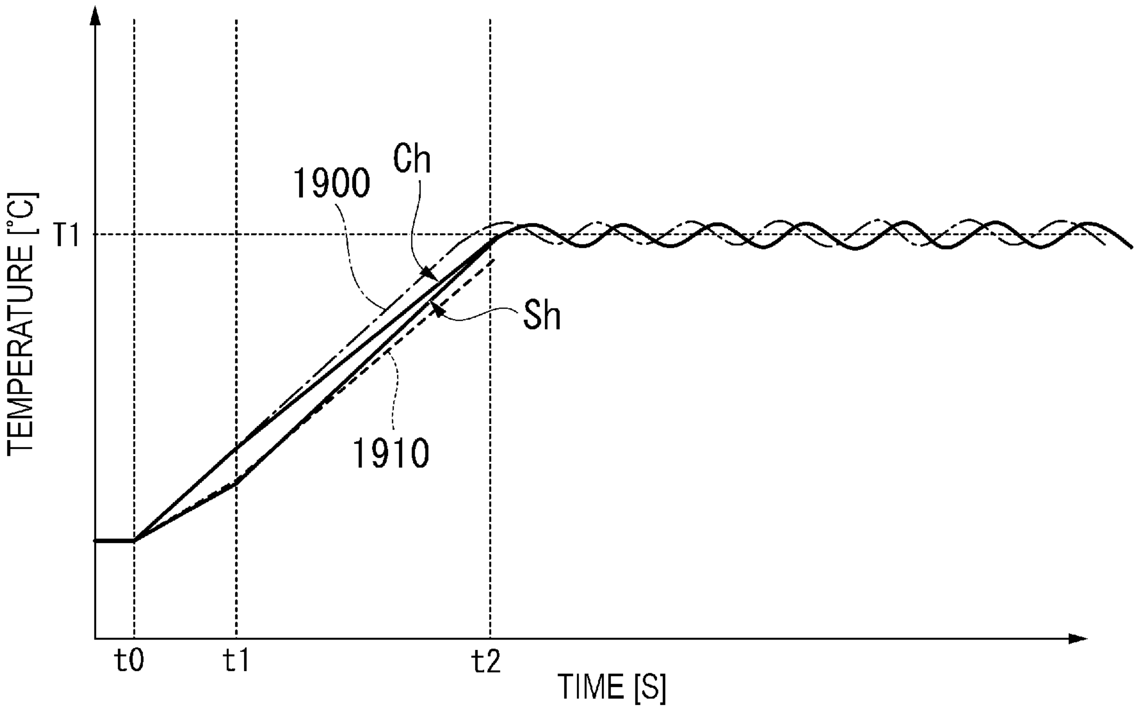
FIG. 19 is a graph illustrating a fifth modification in which the heating control starts with the temperature pattern A based on a small-sized sheet St as the first heating control and then temperature control is switched, according to an exemplary embodiment.

FIG. 19 is a graph illustrating a fifth modification in which the heating control starts with the temperature pattern A based on a small-sized sheet St as the first heating control and then temperature control is switched, according to an exemplary embodiment. If the specification unit 902 specifies the paper feed cassette 141 storing the small-sized sheet St, after the time t0, based on the temperature pattern A, the center heater Ch is heated and controlled so as to reach the target temperature T1 (the high temperature), and the side heater Sh is heated and controlled so as to reach the target temperature T2 (the low temperature).

In the fifth modification, the heating control after the time t1 is different from that of the above-described embodiment. The time t1 is the timing at which the determination unit 904 acquires the determination result of the negative determination. After the time t1, the center heater Ch is heated and controlled so as to reach the target temperature T1. However, in comparison with the above-described embodiment, heating power of the center heater Ch is reduced, and heating power corresponding to the reduced heating power is allocated to the side heater Sh. An alternate long and short dash line 1900 in the drawing indicates the heating control of the center heater Ch in the embodiment. In the fifth modification, after the time t1, the temperature of the center heater Ch rises more gently than the heating temperature according to the embodiment, and the center heater Ch is heated and controlled to reach the target temperature T1.

Referring to FIG. 19, a broken line 1910 in the drawing indicates a hypothetical temperature if the heating control is performed based on the temperature pattern B of the side heater Sh. In the fifth modification, after the time t1, the temperature of the side heater Sh rises more sharply than the case where the heating control is performed based on the temperature pattern B (the broken line 1910), and the side heather Sh is heated and controlled to reach the target temperature T1.

According to the fifth modification, since the side heater Sh can reach the target temperature T1 earlier, the warming-up time in the fixing unit 40 can be shortened. Therefore, during the warming-up, the fixing unit 40 can reach the target temperature more efficiently based on the sheet St having a high possibility to be used.

Next, a sixth modification of the above-described embodiment will be described. In the above-described embodiment, the cassette-temperature correspondence table TB2 (as seen in FIG. 8) is used to specify the temperature pattern associated with the paper feed cassette 141. In the sixth modification, a learned model is used to describe how to specify the temperature pattern based on the paper feed cassette 141.

In the following, the sixth modification describes generation of the learned model if the paper feed cassette ID is used as an input sample and the temperature pattern is used as an output sample. The input sample may include date and time information indicating a time zone, a day of the week, a season, and the like, and environmental information such as ambient temperature, humidity, and the like. The learned model is generated by a learning apparatus such as a personal computer (e.g., processor, etc.). The learning apparatus learns parameters of a classification model such as a neural network by using a data set prepared in advance. The classification model includes an input unit, a feature amount calculation unit, a classification unit, and an output unit. The input unit outputs the input paper feed cassette ID as a vector to the feature amount calculation unit. The input unit forms an input layer of the neural network.

The feature amount calculation unit and the classification unit are intermediate layers of the neural network. The output unit is an output layer of the neural network. The feature amount calculation unit converts the vector input from the input unit into a low-dimensional feature vector, and outputs the converted low-dimensional feature vector to the classification unit. The classification unit converts the feature vector input from the feature amount calculation unit into a P-dimensional vector indicating posterior probability of the temperature pattern represented by the feature vector, where P is a number of temperature patterns to be estimated.

The learning apparatus acquires a learning data set in which the paper feed cassette ID, which is the input sample, and the temperature pattern, which is the output sample, are associated with each other. The paper feed cassette ID is represented by a P-dimensional one-hot vector, if the number of temperature patterns in the data set is set to P.

If the paper feed cassette ID is input, the learning apparatus learns the parameters of the classification model by using the acquired learning data set so as to output the P-dimensional vector indicating the posterior probability of the temperature pattern. Specifically, the learning apparatus learns the parameters of the classification model by using the acquired data set. At this time, the learning apparatus updates the parameters of the feature amount calculation unit and the classification unit in the classification model.

More specifically, the learning apparatus updates each parameter by a gradient descent method so as to minimize a loss function using a calculation result of the classification model. For example, the loss function represents a cross-entropy error between an output value of the classification model and an output sample of the data set. If an evaluation value of the loss function falls below a predetermined threshold value, or if learning processing is repeatedly performed a predetermined number of times, the learning apparatus finishes the learning processing, and the learned model is generated. By inputting the paper feed cassette ID into this learned model, it is possible to calculate an estimated value and output a temperature pattern having a high estimated value.

It is also possible to specify the paper feed cassette ID based on the sheet size information by using the learned model instead of the cassette-sheet size correspondence table TB1 (as seen in FIG. 7). In this case, the learned model may be generated by using the sheet size information as the input sample and the paper feed cassette ID as the output sample. By inputting the sheet size information into this learned model, it is possible to calculate the estimated value and output the paper feed cassette ID having a high estimated value.

In the cases of (2) to (6) among the conditions under which the warming-up starts ((1) to (6) described above), the acquisition unit 901 may not be able to acquire the sheet size information if the warming-up starts. By using the learned model, it is also possible to specify the sheet size information based on each of the conditions (2) to (6). In this case, the learned model may be generated by using identification information indicating each condition as the input sample and the paper feed cassette ID (the paper feed cassette 141) as the output sample. The input sample may include date and time information indicating a time zone, a day of the week, a season, and the like, and environmental information such as ambient temperature, humidity, and the like. By inputting the identification information indicating any one of the conditions (2) to (6) into the learned model, the estimated value can be calculated, and the paper feed cassette ID having a high estimated value can be output as the paper feed cassette ID of the paper feed cassette 141 having a high possibility of being used.

In this manner, by using each learned model, the optimized paper feed cassette ID can be specified based on any one of the conditions (2) to (6). The temperature can be controlled based on the temperature pattern corresponding to the specified paper feed cassette ID.

According to the sixth modification, the temperature pattern based on the paper feed cassette 141 can be specified by using the learned model. In this manner as well, during the warming-up, the fixing unit 40 can reach the target temperature more efficiently based on the sheet St having a high possibility to be used.

While certain embodiments have been described, these embodiments have been presented by way of example only, and are not intended to limit the scope of the inventions. Indeed, the novel embodiments described herein may be embodied in a variety of other forms: furthermore various omissions, substitutions and changes in the form of the embodiments described herein may be made without departing from the spirit of the inventions. The accompanying claims and their equivalents are intended to cover such forms or modifications as would fall within the scope and spirit of the inventions.

As described above, some functions of the image forming apparatus 100 in the above-described embodiment may be implemented by a computer. The program for implementing such a function may be recorded on a computer-readable recording medium and execute the program.

The "computer system" includes operating systems or hardware such as peripheral devices. Further, the "computer-readable recording medium" refers to a portable medium, a storage device, or the like. The "computer-readable recording medium" may be a volatile memory inside a computer system serving as a server or a client.

What is claimed is:

1. An image forming apparatus comprising:

a plurality of sheet storage receptacles configured to store a sheet;

a fixing device configured to heat and fix toner on the sheet conveyed from one of the plurality of sheet storage receptacles; and a processor and a memory configured to:

store temperature information associated with each sheet storage receptacle and related to temperature control of the fixing device, specify the sheet storage receptacle storing the sheet to be printed, and perform a first heating control that controls a temperature of the fixing device based on the temperature information associated with the specified sheet storage receptacle.

2. The apparatus according to claim 1, wherein the processor specifies the sheet storage receptacle storing the sheet in response to the type information of the sheet not being acquired at a start of a warming-up of the fixing device.

3. The apparatus according to claim 1, wherein the processor is further configured to:

determine whether the sheet storage receptacle storing the sheet indicated by the type information and the sheet storage receptacle specified at a start of a warming-up match each other, and perform heating control in accordance with a determination result of the processor.

4. The apparatus according to claim 3, wherein, in response to determining the sheet storage receptacle storing the sheet indicated by the type information and the sheet storage receptacle specified at the start of the warming-up match each other, the processor is further configured to continuously perform the first heating control.

5. The apparatus according to claim 3, wherein, in response to determining that the sheet storage receptacle storing the sheet indicated by the type information and the sheet storage receptacle specified at the start of the warming-up match do not match each other, the processor performs a second heating control that controls the temperature of the fixing device based on the temperature information associated with the sheet storage receptacle storing the sheet indicated by the type information of the sheet.

6. The apparatus according to claim 5, wherein the fixing device includes a heating belt and a pressure roller.

7. The apparatus according to claim 6, wherein the heating belt includes a heater assembly having a first heater disposed in a center portion of the heater assembly and a second heater disposed next to the first heater.

8. The apparatus according to claim 7, wherein the processor is configured to perform a heating control for accelerating a temperature rising speed of the second heater in the second heating control.

9. The apparatus according to claim 1, wherein the plurality of sheet storage receptacles are disposed at varying locations in a height direction.

10. The apparatus according to claim 9, wherein the processor is configured to specify the sheet storage receptacle disposed at an uppermost location relative to the locations of the other sheet storage receptacles.

11. The apparatus according to claim 1, wherein each of the plurality of sheet storage receptacles has a sheet storage capacity differing from sheet storage capacities of the other sheet storage receptacles.

12. The apparatus according to claim 11, wherein the processor is configured to specify the sheet storage receptacle having the largest storage capacity.

13. The apparatus according to claim 1, wherein the processor is configured to specify one of the plurality of sheet storage receptacles based on a number of sheet storage receptacles storing the same type of sheets.

14. The apparatus according to claim 1, wherein the plurality of sheet storage receptacles are respectively associated with a frequency of use of the sheet.

15. The apparatus according to claim 14, wherein the processor is configured to specify the sheet storage receptacle associated with a highest frequency of use.

16. The apparatus according to claim 1, wherein the plurality of sheet storage receptacles are respectively associated with sheet usage history.

17. The apparatus according to claim 16, wherein the processor is configured to specify the sheet storage receptacle associated with a most recently used usage history.

18. A method for controlling an image forming apparatus including a plurality of sheet storage receptacles, a fixing device configured to heat and fix toner on a sheet conveyed from one of the plurality of sheet storage receptacles, a processor and a memory configured to store temperature information, the method comprising:

storing a sheet to be printed in one of the plurality of sheet storage receptacles;

heating and fixing toner on the sheet, the sheet being conveyed from the one of the plurality of sheet storage receptacles;

storing temperature information associated with each sheet storage receptacle and related to temperature control of the fixing device;

specifying the sheet storage receptacle storing the sheet to be printed; and performing a first heating control by controlling a temperature of the fixing device based on the stored temperature information associated with the specified sheet storage receptacle.

19. The method of claim 18, further comprising:

in response to determining the type information of the sheet to be printed has been acquired, specifying a temperature pattern corresponding to the specified sheet storage receptacle.

20. The method of claim 18, further comprising:

in response to determining the type information of the sheet to be printed has not been acquired, specifying a sheet storage receptacle having a storage capacity larger than a storage capacity of at least one other sheet storage receptacles of the plurality of sheet storage receptacles.

* * * * *